INVENTOR
Arthur Rose
BY
Charles J. Elderkin
ATTORNEY

Sept. 7, 1965  A. ROSE  3,204,419
PARTIAL FREEZING PURIFICATION PROCESS
Filed March 7, 1963  6 Sheets-Sheet 2
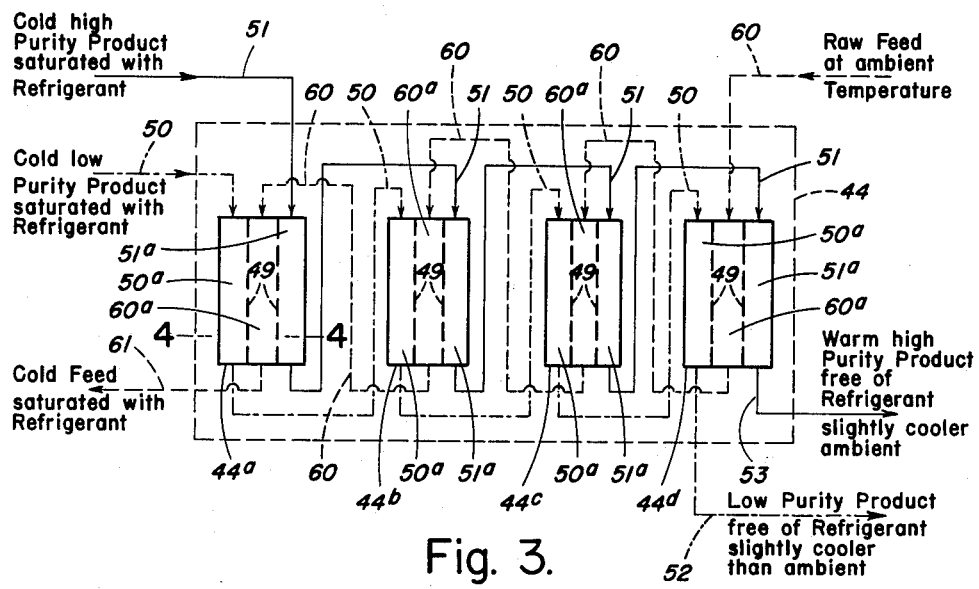
Fig. 3.
Fig. 2.
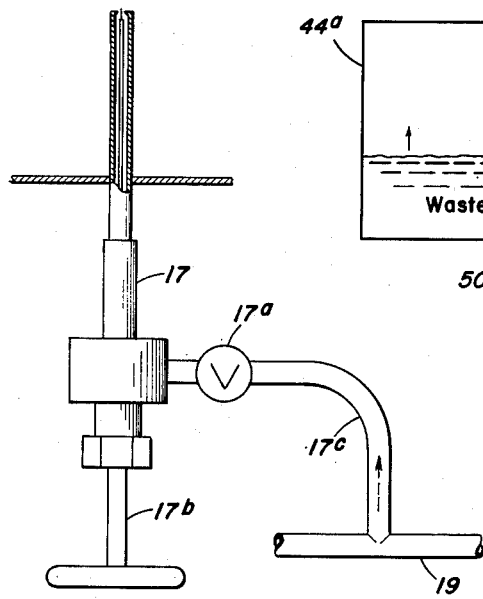
Fig. 4.
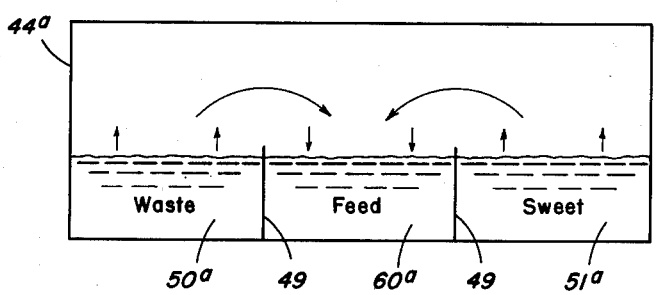
INVENTOR
Arthur Rose
BY Charles J. Elderkin
ATTORNEY Sept. 7, 1965  A. ROSE  3,204,419
PARTIAL FREEZING PURIFICATION PROCESS
Filed March 7, 1963  6 Sheets-Sheet 4

INVENTOR
Arthur Rose
BY
Charles J. Elderkin
ATTORNEY

INVENTOR
Arthur Rose
BY
Charles J. Elderkin
ATTORNEY

3,204,419
PARTIAL FREEZING PURIFICATION PROCESS
Arthur Rose, State College, Pa., assignor to Applied Science Laboratories, State College, Pa.
Filed Mar. 7, 1963, Ser. No. 263,445
8 Claims. (Cl. 62—58)

This application is a continuation-in-part of application Serial No. 805,834, entitled "Saline Water Purification Process," filed April 13, 1959, by Arthur Rose, the applicant herein, and now abandoned.

This invention relates to the treatment of solutions for recovery of relatively pure solvent therefrom and for concentration of the solution. While not limited to such use, the invention is especially applicable to the recovery of pure or substantially pure water from sea water, brackish water, sewage or waste water treatment effluent or other kinds of impure water or aqueous solutions. The invention is also useful for concentrating various kinds of waste liquids or other solutions when such concentration is desired as an end in itself or as a step preliminary to further processing, such as recovery of the solute or solvent; illustrative of which are the concentration of fruit juices, vegetable juices, beer and acetoin solutions.

The invention depends upon partial freezing, partial crystallization, partial precipitation, or like procedures involving formation of a solid from a portion of the solvent of a solution as a basic step in separating solvent from solute. Use of partial freezing to obtain relatively salt-free usable water from sea water, for example, has long been proposed, and various publications have described such processes, the theoretical principles involved being discussed in commonly available chemistry and physics texts. Most prior art workers have considered that partial freezing of sea water or like dilute aqueous solutions results in production of a quantity of pure water ice, and that the unfrozen liquid (mother liquor) contains substantially all of the salts and other dissolved matter originally present. Careful experimentation has confirmed that this is indeed true. However, simple crude separation of the water ice from its mother liquor, as by filtration, gives disappointing results since, when the separated ice is melted, the resulting liquid is usually found to contain 25% to 50% as much salt or solute as was contained in the sea water or other starting solution.

Failure of prior art partial freezing methods to separate solvent from solute more effectively may be attributable to several reasons. Thus, for example, a chief reason for the entrainment of so much dissolved matter with the ice may be that the ice crystals, being quite small in at least one dimension, present a relatively great surface area to the liquid, and the liquid may be held on the larger surface area of the crystals, and in the interstices therebetween, in amounts proportionately quite large relative to the total solvent. It may also be that there is an unusual adhesion between the ice and the adjacent mother liquor, since the two are almost identical in chemical composition.

Thus, when salt water is subjected to partial freezing followed by draining off the unfrozen mother liquor, the ice is usually present as a multitude of small crystals. Appreciable portions of the mother liquor do not drain off and the resulting "ice" is in reality a mixture or mush formed of crystals of pure ice and interstitial solution which may be salty mother liquor. This mush may, however, be often and quite naturally referred to as "ice" and those experienced in the art soon learn to distinguish from the context when "ice" means pure ice, (that is, substantially pure crystals of water without adhering or associated solution or solvent), and when it means "mush."

Regardless of the underlying reasons and terminology, a clear, sharp separation of the ice from the adhering mother liquor is difficult to achieve in practical processes by mere partial freezing followed by simple filtration or draining. Thus, the ice mush obtained by partial freezing of salt (NaCl) solution followed by draining or filtration under various experimental conditions has been found to contain as much as 0.7% salt in the case of a 2% initial salt solution, 2.25% for sea water, 2.2% for a 3.5% initial salt solution, and over 2.5% in the case of a 5% salt solution. Unless remarkably better results can be obtained, it is impossible to produce from saline waters a purified water suitable for drinking, agricultural or industrial purposes (unless the original saline water contains only a little more salt than is desired in the product), except by repeating the partial freezing process two or more times with consequent increase in cost and loss of yield, or by centirfuging or other operations that also increase complexity and costs.

Similar difficulties are encountered in other applications, such as, for example, the purification of various waste waters.

Various schemes have heretofore been proposed to achieve a better separation of solvent from solute. Such proposals include controlled melting, washing with pure water, countercurrent contacting, use of pressure, centrifugation, and growth of larger crystals. None of such proposals has achieved general use, however, possibly because of inability to provide sufficiently pure solvent, comparatively high cost of operation, and other disadvantages. In considering the problem of obtaining usable water from sea water, for example, cost of operation is especially important since, for commercial feasibility, the over-all cost burden must be held to about one one-hundredth of a cent per pound of good purified water produced.

The major difficulties which have stood in the way of development of a partial freezing method, and for the apparatus for carrying it out, are related to the handling or conveying of the ice, and to the production of ice crystals that are easily and quickly washed.

The present invention provides a method and apparatus based on partial freezing for obtaining solvent of as high purity as may be required, for example, by countercurrent multistage contact of ice and mother liquor, without handling or conveying the ice and without repeated freezing operations, and without complicated specialized equipment, and with low energy requirements for refrigeration and with rapid production of ice in a form suitable for rapid effective washing.

In its broader aspects, the method of the invention involves, illustratively, partial freezing of the feed solution, such as raw salt water or a solution derived from the feed, to accomplish initial separation of a portion of the solvent as ice, followed by draining of the unfrozen mother liquor and then a contacting procedure by which the ice is contacted or washed with progressively purer liquor from other parts of the process.

When the washing has continued to the extent necessary to produce ice of the desired purity, the ice is melted, part of the melt being used for washing at a later time or in another part of the process and plant, and the rest of the melt becoming product. An essential feature of the invention is that this sequence of freezing, washing, and melting is carried out in three or more containers at the same time, the operations being timed in staggered fashion so that freezing is done in one or more containers, melting is done in one or more other containers, while washing, mixing and holding operations are going on in the remaining containers. Also, the over-all operation is performed employing a plurality of containers or zones in any of which partial freezing or washing or melting or mixing and holding can be accomplished. Liquid is moved from zone to zone, while ice, as such is retained in the zone in which it is frozen, so that the disadvantages inherent in moving ice from point to point are entirely avoided.

In preferred modifications of the invention where water is the solvent, saturated alkanes, and alkenes, containing from one to four carbon atoms, for example, methane, ethane, propane, propylene, n-butane, isobutane and butenes, and mixtures of the aforesaid substances, are employed. A preferred hydrocarbon refrigerant of the class described is isobutane. It is also noted that mixtures of the aforesaid hydrocarbon refrigerants, e.g. isobutane and butane, isobutane and propane, or butenes, of properly chosen intermediate boiling points, permit reduction in plant equipment costs by permitting the tanks, wherein, illustratively, washing and mixing of water and refrigerant and partial freezing occur, as described hereinafter, to be of higher vertical dimensions, i.e., taller tanks may be used. Other normally gaseous refrigerants that are insoluble in water, or in general, in the solvent, are, however, appropriate for employment herein in certain cases. For example, carbon dioxide or fluorocarbons such as "Freons" may be used where hydrocarbons must be avoided because of the nature of the material being processed.

Advantageously then, and by way of illustration, partial freezing is accomplished in accordance with the practice described herein by introducing into the liquid solution, a liquefied normally gaseous refrigerant which is nearly completely insoluble in, or at least of very low solubility in, the solvent of the solution involved, and which condenses at temperatures near the freezing point of the solvent. Introduced in liquefied form into the solution in one freezing and contacting zone or container, the refrigerant vaporizes and expands, absorbing heat from the solution and so causing partial freezing of the solution, while the major proportion of the expanded, now gaseous refrigerant escapes from the solution. The refrigerant vapors are recovered, compressed, and introduced into a second zone containing ice or crystals of substantially the desired purity. On contacting the ice or crystals in the second zone, the refrigerant vapors condense, melting a portion or all of the substantially pure ice or crystals and so provide a quantity of relatively pure liquid solvent, some of which is to be introduced later into a third zone containing ice or crystals which, while of relatively high purity, require an additional wash for final solute removal. The remainder of the relatively pure liquid solvent constitutes product.

This manner of employing the normally gaseous, substantially insoluble refrigerant thus accomplishes the plural functions of partial freezing, to provide ice in at least one zone, and melting to provide cold, purer liquid in another zone. Additionally, introduction of the refrigerant to accomplish partial freezing of the solution causes sufficient agitation to mix the solution and ice or crystals, assuring effective contact between the liquid and solid phases. The expanding refrigerant also serves to cool the solution in case its temperature rises above its freezing point, due to heat leakage or other reasons.

The method of introducing refrigerant into the liquid to be partially broken, while this liquid is held in an overall stationary position by virtue of being in a container or tank, but at the same time violently agitated by the expanding rising refrigerant, is an advantage of the herein-described batch process over prior art continuous methods in that the resulting ice crystals are more easily washed. The advantage may arise because in the batch process the first part of the refrigerant produces ice crystals while later portions of refrigerant cause these crystals to grow, whereas in comparison, in a continuous process all the isobutane required for a given flow of liquid is added to the liquid at one point, which may result in formation of a much larger number of smaller crystals which do not grow.

When the feed is raw salt water, normal butane, and preferably isobutane, are particularly effective refrigerants for use in accordance with the invention. Other normally gaseous refrigerants, as indicated above, including light hydrocarbons other than isobutane, can be employed. The liquid refrigerant may be bubbled into the bottom of the container of salt water through small pipes or other orifices, but preferably it is introduced into the salt water as a rapidly moving fine stream through nozzles such that the refrigerant remains liquid until it is actually inside the body of the raw salt water. The latter technique is significantly superior in terms of smooth operation and obtaining ice crystals suitable for easy washing.

In brief, therefore, the instant process contemplates in a preferred embodiment producing sweet or pure water from saline water by partial freezing, with separation of the unfrozen mother liquor by draining and washing, and melting of the resulting ice; this operation being accomplished without moving the ice.

The method of the invention is also adapted for use in suitable cases with non-aqueous solutions in which equivalent partial crystallization or solid formation of the solvent due to cooling can be had.

A general object of the invention therefore is to separate a purified liquid from material dissolved in the liquid, and particularly to obtain a highly purified liquid from a comparatively strong solution. Thus, the invention is particularly useful in obtaining potable water from sea water.

A further object is to devise a method and apparatus for carrying out such a procedure in batchwise, but continuous batch after batch fashion.

Another object is to provide a method that produces solid crystals that can be washed easily.

Yet another object is to provide a partial freezing process which is flexible in the sense that it is applicable to various solutions, provides for recovery products of various degrees of purity, and can be operated on a small, medium or very large scale.

A still further object is to devise such a method which is capable of being carried out with relatively simple, low cost and standard equipment.

Another object is to provide such a method and apparatus wherein a much higher efficiency of heat transfer and a higher conservation of both energy and purified (or partly purified) product are attained.

In order that the manner in which these and other significant objects and advantages are achieved in accordance with the invention, reference is had to the accompanying drawings, which form a part of this specification, and wherein:

FIGURE 2 is an enlarged elevational view, a portion of which is cut away to present a sectional view, of a valve element of the system described in FIGURE 1;

FIGURE 3 is a diagrammatic view of a component suitable for substitution in the system described in FIGURE 1;

FIGURE 4 is, in turn, a semi-diagrammatic cross-sectional representation of an element of the component illustrated in FIGURE 3.

Figure 1:
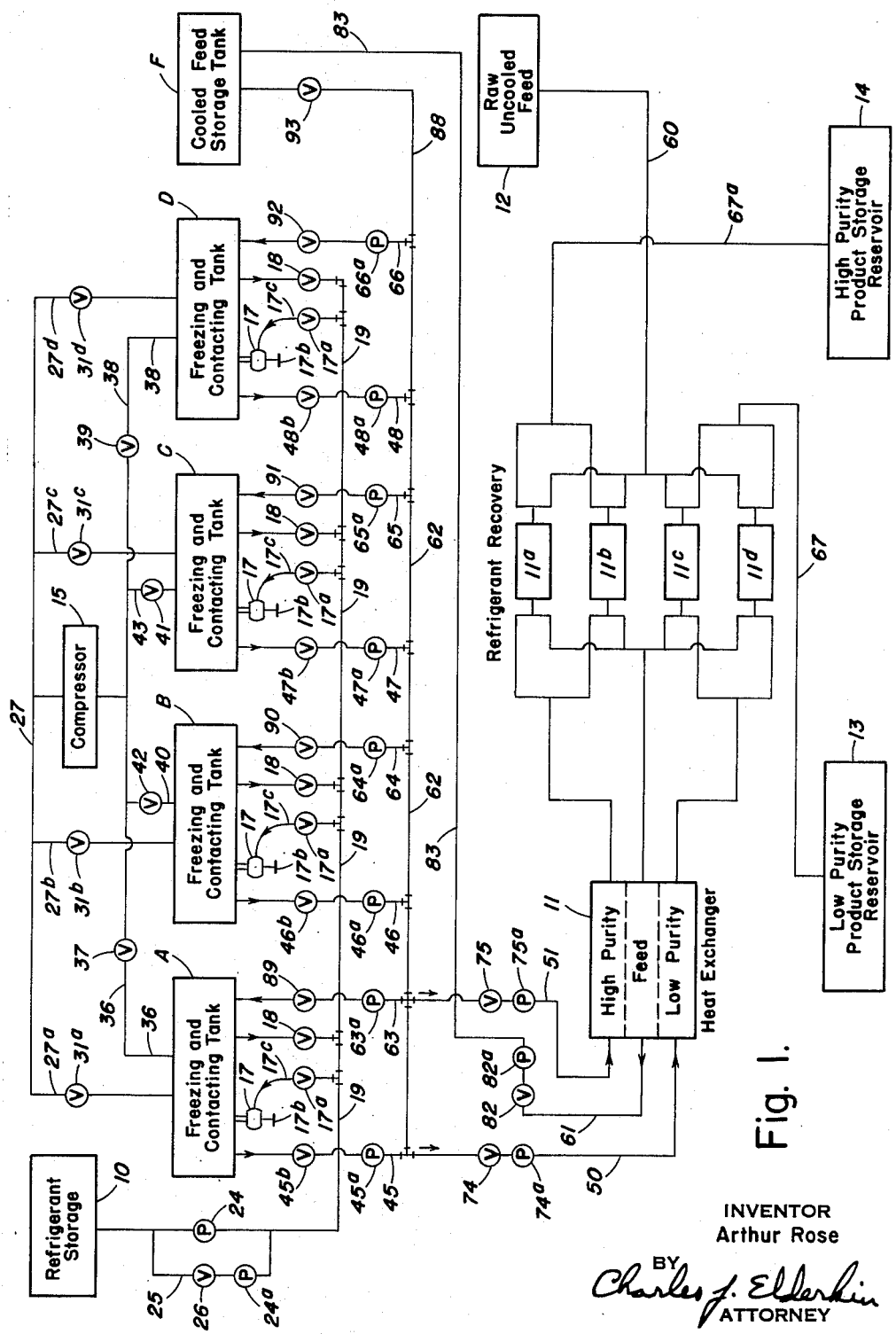
FIGURE 1 is a schematic diagram of one system of apparatus with which the method of the invention can be carried out.

The method of the invention will now be described with reference to the accompanying drawings and with particular reference initially to the illustrative embodiment as represented in FIGURE 1 in which, as in all the drawings appearing herein, like letters and numbers in the written description and drawings designate like parts. This embodiment involves recovery of potable water from sea water. The components of the apparatus employed herein may be of standard construction. Thus, conventional tanks, piping, pumps and compressors well known heretofore may constitute the elements of the assembly. In order to enhance the economy of the subject procedure, a factor of ultimate significance in this field, a batch process is employed, as indicated above, wherein the materials move through a plurality of tank units. Thus, four batches of material are processed at one time in four locations in the apparatus of the invention as seen in the associated FIGURE 1; the individual batches proceeding therethrough in parallel but staggered fashion so that freezing is being carried on in one tank, washing in a second tank, melting in a third tank, and holding and mixing in a fourth tank.

The process described in this illustrative modification, then, takes place in four main time periods, ($1a$ to $1p$, $2a$ to $2p$, $3a$ to $3p$, and $4a$ to $4p$, as described hereinafter in detail with relation to FIGURES 5 to 8, inclusive), each of which may, in turn, be considered as divided into sixteen subdivisions of time. After completion of one cycle of the four principal time phases or periods, encompassing the sixty-four subperiods as described hereinafter, the cycle is repeated continuously.

Returning to the illustrative embodiment of the system represented in the accompanying semidiagrammatic drawing of FIGURE 1, it will be seen that the process utilizes a plurality of tanks designated A, B, C, D and F, a refrigerant storage tank 10, a heat exchanger 11 and refrigerant recovery units $11a$, $11b$, $11c$ and $11d$, a raw feed container 12, a low purity storage reservoir 13, and a high purity product storage reservoir 14.

Each of tanks A, B, C, D and F, as well as the refrigerant storage tank 10, the compressor 15, the heat exchanger 11, the pumps and all of the connecting lines are fully insulated. Each of tanks A to D is provided at its bottom with suitable filtering means consisting, illustratively, of 4-mesh screens disposed across the openings of outlet pipes. It is found that when liquid is removed through the bottom of the tank, ice or crystal mush, that is, crystals or particles of frozen solvent plus adhering and interstitial solutions, in the tank will be retained by the screen. A 4-mesh screen will not always be suitable, because the properties of the mush in the tank will vary. In some cases a one-inch screen is satisfactory, and in other cases a fine mesh filter screen or cloth will be required.

Tanks A to D are equipped with refrigerant injectors as designated by the numeral 17, located at the bottom of the aforesaid tanks; each of which is constructed and arranged to admit refrigerant upwardly into its respective tank. The refrigerant injectors are connected by means of the valves $17a$ to a refrigerant supply pipe 19. It is to be understood that in a small plant where tanks A, B, C, D would be, for instance, only 6 inches or 12 inches in diameter, one refrigerant injector per tank would be adequate and satisfactory, but in larger plants with tanks of larger horizontal dimensions it is necessary to use a number of injectors per tank, these being connected to a common manifold. A porous hose similar to that often employed in the watering of lawns and gardens is suitable in some cases for providing an economic injector means with multiple openings. In other cases a specially designed injector must be used. This special valve-injector system is seen in an enlarged partially sectional view in FIGURE 2 wherein the injector is that designated 17 and the needle valve is positioned by the handwheel $17b$. The coarse valve $17a$ is also disposed along the course of the connection $17c$ to the refrigerant supply pipe 19 as shown in the detail of this latter FIGURE 2. In some cases where flexibility of injector operation is not required the fine needle valve adjustment (FIGURE 2) is omitted from the injector 17 and the injector may, as a result, be constructed with an orifice of fixed size. The refrigerant supply pipe 19 is connected by means of a standard pump means to the refrigerant storage tank 10. Thus, by operation of the pump 24, of standard construction, refrigerant can be introduced into any or all of the tanks A through D, in controlled amounts, via the aforesaid injectors or valves 17.

A by-pass 25, controlled by valve 26, and a second pump $24a$ also of standard construction, is provided about the pump 24. The arrangement is such that, with the valve 26 open and the pump 24 not operating, liquid refrigerant can be returned from any of the tanks A–D to the storage tank 10, the appropriate one of the valves 18 being opened to allow such return. Any minute quantities of either water or refrigerant withdrawn with refrigerant or water, respectively, are readily separated by standard procedures, and will not adversely affect the practice of the invention.

As noted hereinafter the liquid present in the tanks, (for example, tank D in step $1i$ of FIGURE 5 or tank C in step $2i$ of FIGURE 6), is removed prior to removal of the refrigerant from the bottom of the tank. This is, of course feasible due to the disposal inherently of the brine and liquid refrigerant in layers, when there is no agitation. Thus, separation and removal are readily controlled by visual means or by other standard techniques based on specific gravity.

At their tops, each of the tanks A to D inclusive is connected to a refrigerant vapor conduit $27a$, $27b$, $27c$ and $27d$, respectively. These conduits include the valve means $31a$, $31b$, $31c$ and $31d$, respectively, and all are connected to the intake of the compressor 15 by means of the common conduit 27. Conduit 36, including valve 37, is connected between the output of compressor 15 and the top of tank A. The top of tank D is similarly connected to the compressor output via conduit 38, including a valve 39. The tops of tanks B and C are placed in communication with the output of the compressor by conduits 40 and 43, respectively, valve 42 being provided in conduit 40 and valve 41 being provided in conduit 43. Thus, the compressor 15 can receive refrigerant from tanks A–D, and the refrigerant can be supplied from the compressor to any of the tanks A–D other than the one from which the vapors are being withdrawn.

While there is shown in FIGURE 1 a single compressor, it is to be understood that two or more compressors in parallel or series may be used in actual practice. In general, increased over-all efficiency will be achieved if the bulk of the compressor work is done by one or more machines working over a narrow temperature and pressure range corresponding to slightly more than the difference between the freezing point of the pure solvent and the solutions, while smaller compressors operate over the wider range corresponding to room temperature and the freezing point of the solvent or solutions.

Heat exchanger device 11 may be of conventional design constructed to handle three separate liquid streams, one of these carrying the incoming raw feed, this stream being cooled by flowing in a manner countercurrent to the other two which carry the high purity and low purity products.

The refrigerant recovery devices or elements $11a$, $11b$, $11c$ and $11d$ are conventional carbon absorption tower units. At any one time during the operation of the instant process, one of the aforesaid units is being traversed by high purity product leaving the subject apparatus having completed the process envisioned herein; a second unit is being traversed by low purity product leaving the subject apparatus; and the third and/or the fourth unit, is being traversed by the incoming raw feed. Operation is in general similar to any regeneration heat recovery unit. The streams leaving the process give up their dissolved refrigerant to the carbon in the first and second towers. This carbon then gradually loses its capacity to adsorb or absorb more refrigerant. At the same time the incoming raw feed stream picks up from the carbon in its tower at least part of any adsorbed refrigerant that may be present and carries the refrigerant back into the process. Before the outgoing streams have exhausted the adsorbing capacity of the carbon in the refrigerant recovery devices through which these outgoing streams are flowing, appropriate valves are changed so that the outflowing streams then flow through refrigerant recovery devices previously used for incoming water, and the incoming water flows through the devices previously traversed by the effluent streams, suitable precautionary measures being taken to prevent undue contamination of the total effluent by such means as returning to the process the first portion of high purity effluent issuing from a refrigerant recovery device just previously used for incoming feed. This general type of operation used here with devices 11a, 11b, 11c, 11d, is well known and will be readily understood by those experienced in material processing.

In FIGURE 1 refrigerant recovery devices 11a, 11b, 11c, 11d, are so located as to be at ambient temperature and between the heat exchanger 11 and the storage tanks 12, 13 and 14. Alternatively, the units 11a through 11d, inclusive, may be positioned between the heat exchanger 11 and the processing tanks A, B, C, D and F in which case 11a, 11b, 11c, 11d must be insulated because they will operate at about the freezing point of the solvent being processed. A further alternative to be discussed hereinafter with relation to FIGURE 3, involves the incorporation of heat exchanger 44 and refrigerant recovery units 44a, 44b, 44c and 44d in a single apparatus. In case a direct refrigerant is not used at all, then devices 11a, 11b, 11c and 11d are omitted, and the refrigerant lines 27a, 27b, 27c, 27d, 36, 38, 40 and 43 do not lead directly into tanks A, B, C and D but instead are connected to the upper ends of heat exchangers that are within these tanks. The lower ends of said heat exchangers are connected to line 19 through a line in which the injector 17 is replaced by an expansion valve, and the line controlled by valve 18 contains a suitable trap. Thus the heat exchangers alternately serve as expansion coils and condensers of conventional refrigerating systems. Alternately, some other immiscible liquid may replace the refrigerant.

It is not essential to the instant invention to use heat exchanger and refrigerant systems such as those just described. Other known or entirely new arrangements thereof are compatible with successful operation of the over-all process. One such new arrangement that is advantageously adapted to the present invention is the exchange of heat by passage of the incoming and outgoing streams through tanks or towers of the insoluble liquid refrigerant, with switching of streams through several towers in parallel in a conventional regenerative manner. Still another arrangement is shown in FIGURE 3. In this device 44 the cold liquid is flowed adjacent to and in heat exchange relation with a stream of raw feed solution in such fashion that while liquid-to-liquid contact between the streams is avoided, substantial amounts of refrigerant vapors escape from the cold product stream and are dissolved in the warm feed stream. Illustratively, this stripping operation may be accomplished with a device consisting of an enclosed inclined plane on which the three liquid streams flow, separated by vertical retaining walls or baffles that are of sufficient height to prevent mixing of the liquid streams, but these baffles do not reach the upper enclosing surface so that the vapors above the several liquids can mix freely. An illustrative unit 44a of this type is represented in cross-section in FIGURE 4. Thus, while the liquid streams are separated by the baffles 49, transfer of refrigerant vapor can occur between the streams through the gas space above them. To elaborate on the theory of transfer, and without intent to be limited to a particular theory of operation, the exchange or transfer would appear to occur because of a partial pressure difference of the refrigerant in the streams. The partial pressure of dissolved refrigerant in any stream is a function of both temperature and concentration in the liquid. Thus, even though there is a lower temperature favoring a lower partial pressure in the product stream than in the feed stream at any one point, the concentration is sufficiently high in the product stream to cause a favorable partial pressure gradient.

The heat exchanger and refrigerant recovery device 44 of FIGURE 3 comprise a plurality of the aforesaid units designated 44a, 44b, 44c and 44d, arranged in series. The over-all device 44 of FIGURE 3 is constructed to handle three liquid streams all flowing in the same direction in each of the aforesaid baffled (49) units 44a to 44d, inclusive, but one stream flowing in a manner countercurrent to the other two streams with relation to the series of units 44a, 44b, 44c and 44d. More or less than the four units 44a-44d inclusive may be employed in practicing the present invention, however. To elaborate on this relationship for the purpose of clarity of portrayal, the streams entering the first unit 44a initially through the conduits 50 and 51 of FIGURE 1 and FIGURE 3, flow through those portions 50a and 51a of the first unit 44a as seen in FIGURES 3 and 4 and sequentially through like portions of the remaining units 44b, 44c and 44d of the over-all device 44, proceeding to the product storage reservoirs 13 and 14. Simultaneously, the raw feed solution stream passes initially into the unit 44d from the container 12 through the conduit 60 and enters the top of the unit 44d flowing down through the central portion 60a of said unit separately from but concurrently with each of the aforesaid streams; thus flowing in a countercurrent manner sequentially through the units 44c, 44b and 44a, and outwardly therefrom through the duct 61.

To further illustrate this relationship, reference is made to a situation in which streams of cold sweet water (solvent) and cold saline water (waste brine solution) are entering the apparatus. These streams from the conduits 50 and 51 enter the coldest unit 44a of the assembly 44 at temperatures of 32° F. and 24° F., respectively; the sweet water being saturated with 110 p.p.m. of isobutane and saline water with 50 p.p.m. of said refrigerant. At the same time cooled feed water is also entering the unit 44a, the feed water having, for example, a temperature of 45° F. and containing 110 parts per million (p.p.m.) of refrigerant. The feed stream is at ambient temperature and free of refrigerant when initially entering the device 44 and specifically the warmest unit 44d through the pipe 60, but in passing through the increasingly colder units, 44c and 44b, with ample opportunity to exchange heat and refrigerant, the feed stream reaches the temperature and refrigerant content recited above at the time it enters the coldest unit 44a. Thus, in passing through this latter unit, temperature and refrigerant concentrations of the three streams tend to become substantially the same, since the streams are flowing in parallel.

The flows at the exits of each of the units 44a, 44b, 44c and 44d evidence a difference in temperature due inherently to the rate of flow; thus at the exit from the coldest unit 44a, the temperature of the sweet water stream is 40° F. and the waste saline water has a temperature of 34° F. A stream, in this illustration, from the time of its investment in the device 44 until its emergence from the warmest unit thereof 44d is found to change in refrigerant content from an initial 110 p.p.m. to a terminal content of 6 p.p.m. of refrigerant, an effective removal of refrigerant from the solvent stream of over 90 percent. This result obtains since there is normally a difference in temperature of only 0.5° F. to 1° F. among the various streams at their exit from the highest temperature unit 44d and since, in addition, the entering feed has 0 p.p.m. of refrigerant while the other streams have had much of their refrigerant removed before they reach this point. As a result, the streams flowing in parallel through the unit 44d, tend to approach equilibrium and the outgoing streams evidence substantial depletion of refrigerant.

The units 44a, 44b, 44c and 44d of the device of FIGURES 3 and 4 are, as indicated above, so constructed that the liquid streams are kept entirely separate. While this is so, however, the vapors emitted from one stream are free to dissolve in the liquid of an adjacent stream using a baffled construction, for example. The nature and operation of the device 44 of FIGURES 3 and 4 may be further clarified by reference to a section view of any unit of the device 44 such as that of FIGURE 4 taken along the line 4—4 of the unit 44a of FIGURE 3 and alluded to above. In this section, the liquids are seen to flow in the same direction, along the course of the resulting streams. As they flow, they tend to become equal in temperature and in the partial pressure of the dissolved refrigerant, the direction of the vapor phase across the unit 44a being from the side channels 50a and 51a to the center feed channel 60a, as indicated by directional indication shown in FIGURE 4.

That the over-all device of FIGURE 3 must result in refrigerant depletion of the product stream may be noted by considering the situation that prevails when a single unit such as 44a is fed at its upper end (middle channel) 60a with feed water containing no isobutane, and also (outside channels) 50a and 51a with cold waste brine and cold sweet water, respectively, each saturated with isobutane. As the three streams flow along the channels, some of the isobutane will soon vaporize from the cold liquids, even though they are cold, and this isobutane vapor like any gas or vapor will soon diffuse through the entire space above all the liquids, and some of it will then come in contact with the surface of the feed liquid flowing in the central channel 60a, and since this liquid contains no isobutane when it enters the device it will have a capacity to dissolve and absorb isobutane. Consequently, some of the isobutane in contact with the surface of the liquid will therefore dissolve in the liquid. The amount that dissolves in any given case depends on the temperatures, initial concentrations, rates of flow and the length and other geometric characteristics of the system. By making the flow channels 50a, 51a and 60a long enough, and/or the flow slow enough, about half of the entering isobutane can be transferred. In practice the usual economic factors related to cost of construction and need for appreciable production rates establish the actual transfer at a somewhat lower amount. While physical laws of course determine the relation between the effluent and feed streams and the resulting recovery of refrigerant from the former, the operating conditions are not normally critical but depend more on economic efficacy in each instance. The most significant physical relationship in effecting refrigerant transfer from the effluent streams is, however, not temperature but concentration of refrigerant as the streams are disposed in countercurrent flow in the refrigerant exchangers which are disposed in series.

Tanks A to D inclusive, to which are connected lines 45 to 48, respectively, with pump members 45a to 48a, respectively, and the valves 45b to 48b, respectively, are preferably equipped with screens or other straining devices, so that solid is retained in the tanks when liquid is removed therefrom. Lines 63 to 66 may enter the tanks below this screen so that incoming wash liquid provides agitation for thoroughly mixing and scrubbing the solid phase. Alternately, lines 63 to 66 may enter the tanks above the screen, or above the material in the tank, in order to accomplish the types of washing described hereinafter, which require introduction of wash water or liquid to the top of the bed that is to be washed.

Lines 45 to 48 lead to a common line 62, thence via lines 50 or 51 to heat exchangers 11, and through refrigerant recovery equipment 11a to 11d, if used, to the low purity product storage reservoir 13 and the high purity product storage reservoir 14, respectively. Hence, liquid withdrawn selectively from tanks A to D can be passed through separate channels of heat exchanger and refrigerant recovery devices 11a to 11d to either reservoir 13 or reservoir 14.

Raw feed container 12 is connected by pipe 60 and the one or two of the units 11a, 11b, 11c and 11d, not connected to pipes 67 and 67a, to the remaining inlet of the heat exchanger 11, the corresponding outlet fitting thereof being connected via pipe 61, valve 82 and pump 82a, to a pipe 83 which leads to tank F. It will thus be understood that, while liquid from any of the tanks A to D is flowing through the heat exchanger 11, or at any other time, raw feed solution can be delivered from tank 12, through devices 11, 11a, 11b, 11c and 11d, to tank F.

Assuming that cold liquid product, containing dissolved refrigerant, such as isobutane, is being flowed through the heat exchanger 11, via pipe 50 or pipe 51 and, for example, the unit 11a, and that raw feed solution is simultaneously fed through devices 11c and 11, via pipe 60, it will be understood that the refrigerant will be removed from the product and adsorbed in the carbon and that the raw feed solution will pick up refrigerant and carry it into the process. Thus, passage of the product and the raw feed simultaneously through devices 11a, 11b, 11c and 11d not only results in cooling of the feed but also in stripping the refrigerant substantially from the product streams.

It will be clear from FIGURE 1 that once a quantity of cooled feed has been supplied to insulated tank F, portions or all of this quantity of feed can be delivered to any of the freezing and contacting tanks A to D, via valved lines 63 to 66 which are also equipped with pumps 63a to 66a.

Pipes 45 to 48 have heretofore been mentioned with respect to withdrawal of high purity and low purity products from tanks A to D. It is to be understood that, via these pipes, common pipe 62 and pipes 63 to 66, liquid can be withdrawn from and delivered to any of tanks A to D. Such tank-to-tank transfer of liquid can be accomplished by suitably located conventional pumps and valves such as 45a, 45b, 46a, 46b, 47a, 47b, 48a, 48b, 63a, 89, 64a, 90, 65a, 91, 66a and 92, or in any other conventional manner. It is also to be understood that in large tanks, there may be more than one system of inlet and outlet pipes or conduits, such as those indicated by the numerals 45 to 48 and 63 to 66 in FIGURE 1, for a given tank and that such multiple lines will be connected to the tank in parallel by means of suitable manifolding. It is to be understood that other piping, valving and pumping arrangements may also be used. Thus, for example, lines 63 to 66 may be connected to a second common line, supplementing the function of line 62, which is connected, in turn, to line 62 via a line containing one pump which replaces the several pumps shown in FIGURE 1.

While the term "tank" has been employed for simplicity with reference to containers A to D and F, it is to be understood that various kinds of containers, vessels, reservoirs and like zones of reference can be employed in accordance with the invention. Thus, for large-scale operation, containers A to D and F can be concrete or stone reservoirs, or earth reservoirs, suitably treated with chemicals or films to decrease permeability, and built below ground level to minimize heat gain from the atmosphere. To form gas-tight covers over the tops of such containers, unsupported or supported plastic films or metal foils are used, these being partly or entirely supported by the pressure of the refrigerant gas within the containers, and insulation from the atmosphere being achieved by means of plastic foam, metal foil, growing vegetation or more conventional means.

The detailed manner in which the method of the invention is carried out in the preferred embodiment involving recovery of potable water from sea water will now be described with specific reference to FIGURES 5 to 8, considering use of the system referred to hereinabove with relation to FIGURE 1. In this description the word "mush" signifies a mixture of finely-divided ice and its adhering and interstitial solution. It is noted that the approximate amounts of solution moved and mush present during the course of the process are indicated numerically in the accompanying drawing, e.g., 240, 40, 140, 40, 140, and 140, respectively, in step 1a. For simplicity of description, it will be presumed that, by the steps made evident from the detailed description appearing hereinafter, there has first been established (1a of FIGURE 5) in one zone, tank A, a suitable quantity, e.g. 240 pounds, of low purity, low temperature salt water solution (batch L-1); in a second zone, tank B, a quantity, e.g. 180 pounds, of mush (I-3) and salt solution (L-2) which is approximately of the feed water composition; in tank C, about 180 pounds of good purity mixture consisting of mush (I-2) and salt solution (L-3) with roughly half the salt concentration of the feed; and in tank D, about 140 pounds of mush (I-1) which, when melted, will give water of the desired product purity. See 1a of FIGURE 5.

The succeeding steps appearing in sequence are then as follows:

*Step 1b.*—Compressed, liquid isobutane is now supplied from storage container 10, FIGURE 1, via injector 17 to tank A, the refrigerant being injected upwardly into the body of batch L-1 of low purity salt solution in the aforesaid tank A, through fine discharge orifices preferably, to effect an agitated bubbling action therein, and expansion of the refrigerant in contact with the solution in the tank A. The pressure and rate at which the refrigerant is injected are not critical except that they must be such that the discharge orifices will not be closed by ice formation, and in any given application, the pressure and rate of introduction of refrigerant are design variables determined by the composition, quantities, and nature of the materials processed, product specifications, etc. and economic factors. The expanded refrigerant vapors from tank A are led, via valve 31a and lines 27a and 27, to compressor 15, the compressor being operated to compress, but not liquefy, the refrigerant vapors. From the compressor, the refrigerant vapors are led via line 38 and valve 39, into tank D, where the vapors come into direct contact with batch I-1 of high purity mush previously established in the tank. Upon contact with the mush, the refrigerant vapors are condensed, causing melting of the ice. Step 1b therefore is effective to provide in tank A a mixture of mush (I-4) and low purity salt solution (SL-1), and, in tank D, a quantity of water of the desired product purity, i.e. substantially pure water. There also exists in tank D a substantial quantity of liquid refrigerant (R-1) which, being almost completely insoluble in water, is predominantly present as a separate liquid phase.

*Step 1c.*—The contents of the tanks A and D are allowed to become quiescent, so that the mush and liquid separate in tank A and, in tank D, the two liquid phases separate.

*Step 1d.*—Part (e.g. 100 pounds) of the easily drained solution from tank A is now removed from the tank, passing downwardly through the filtering means disposed therein, by means of and through the pipe 45 and the valve 74, and is pumped through the low purity product side of the heat exchanger 11 and refrigerant recovery device 11c, being finally delivered as batch SL-1 to low purity product storage reservoir 13. It is to be noted that 140 pounds (batch I-4) of low purity mush remains in tank A, this being a mixture of ice and the salty mother liquor on its surfaces and in the interstices of the actual ice crystals. Simultaneously, raw feed (arbitrarily designated batch F-2) is pumped from vessel 12, via line 60, through the device 11d and the heat exchanger 11 and thence through lines 61 and 83 to tank F. Immediately after batch SL-1 has been transferred, and while continuing to pump raw feed, 100 pounds of the cold high purity water (batch PL-1) is pumped (by pumps 48a and 75a) through valve 48b, valve 75 and pipe 51 through the high purity side of the heat exchanger 11 and refrigerant recovery devices 11a to the reservoir 14. By such simultaneous passage of cold product and raw feed through the devices and units 11 and 11a, 11b, 11c and 11d, the products pick up heat from the feed; the feed is accordingly cooled, and the products give up substantially all dissolved refrigerant in the adsorbing devices 11a, 11b, 11c and 11d. At this time there are left in tank D, 40 pounds of high purity water and an upper layer R-1 of liquid refrigerant.

*Step 1e.*—The cooled feed (F-2) (200 pounds) is transferred from tank F through valve 93, lines 88, 62, 63, and valve 89, into tank A. At the same time (or immediately before or after entry of F-2) a quantity (40 pounds) of solution L-2 is transferred from tank B through lines 46, 62 and 63 and valve 89 into tank A.

*Step 1f.*—This represents merely the interim period between 1e and 1g and in the drawings shows the status of the components involved in the tanks at the completion of Step 1e.

*Step 1g.*—The solution L-3 in tank C is withdrawn downwardly through the filtering means in that tank via line 47, and is pumped via common pipe 62, line 64 and valve 90 into tank B, where it contacts mush I-3. This step leaves mush I-2 in tank C ready for further washing, and brings the good purity solution L-3 in contact with mush I-3 so that after contacting, this mush I-3 will contain a considerable proportion of solution of good purity.

*Step 1h.*—This step indicates the status of the components involved at the conclusion of 1g in the drawings and prior to initiation of Step 1i.

*Step 1i.*—The high purity water L-4 in tank D is now withdrawn downwardly, through the filtering means in the tank through line 48 and into tank C via common pipe 62, line 65 and valve 91. There is thus provided in tank C a mixture of high purity water L-4 and mush I-2 which after contact will give a mush containing a considerable proportion of solution of high purity.

*Step 1j.*—This step is again one intended to point out the positions in the tanks of the individual components at the conclusion of Step 1i.

*Step 1k.*—The water in tank D having been removed by Step 1i, the liquid refrigerant remaining in that tank is now removed, via valve 18 and pipe 19, and returned to refrigerant storage tank 10. At this point tank D is substantially empty.

*Step 1l.*—A quantity (240 pounds) of feed composition solution L-2 is transferred from tank A into tank D via valve 45b, lines 62, 66 and valve 92.

*Step 1m.*—The interim phase serves in the accompanying drawings to locate the component elements in the aforesaid tanks, prior to initiation of Step 1n.

*Step 1n.*—Good purity salt solution L-3 is transferred from tank B through lines 46, 62, 63 and valve 89 to tank A.

*Step 1o.*—This phase indicates location of the component elements prior to initiation of Step 1p and completion of Step 1n.

*Step 1p.*—High purity solution L-4 is transferred from tank C through lines 47, 62, 64 and valve 90 to tank B.

*Step 2a* (see FIGURE 6).—This is an interim step identical with step 1a except that tank A now contains materials of approximately feed composition, tank B contains much and salt solution of good purity, tank C contains much with solution of high purity, and tank D contains low purity salt solution.

Figure 6:
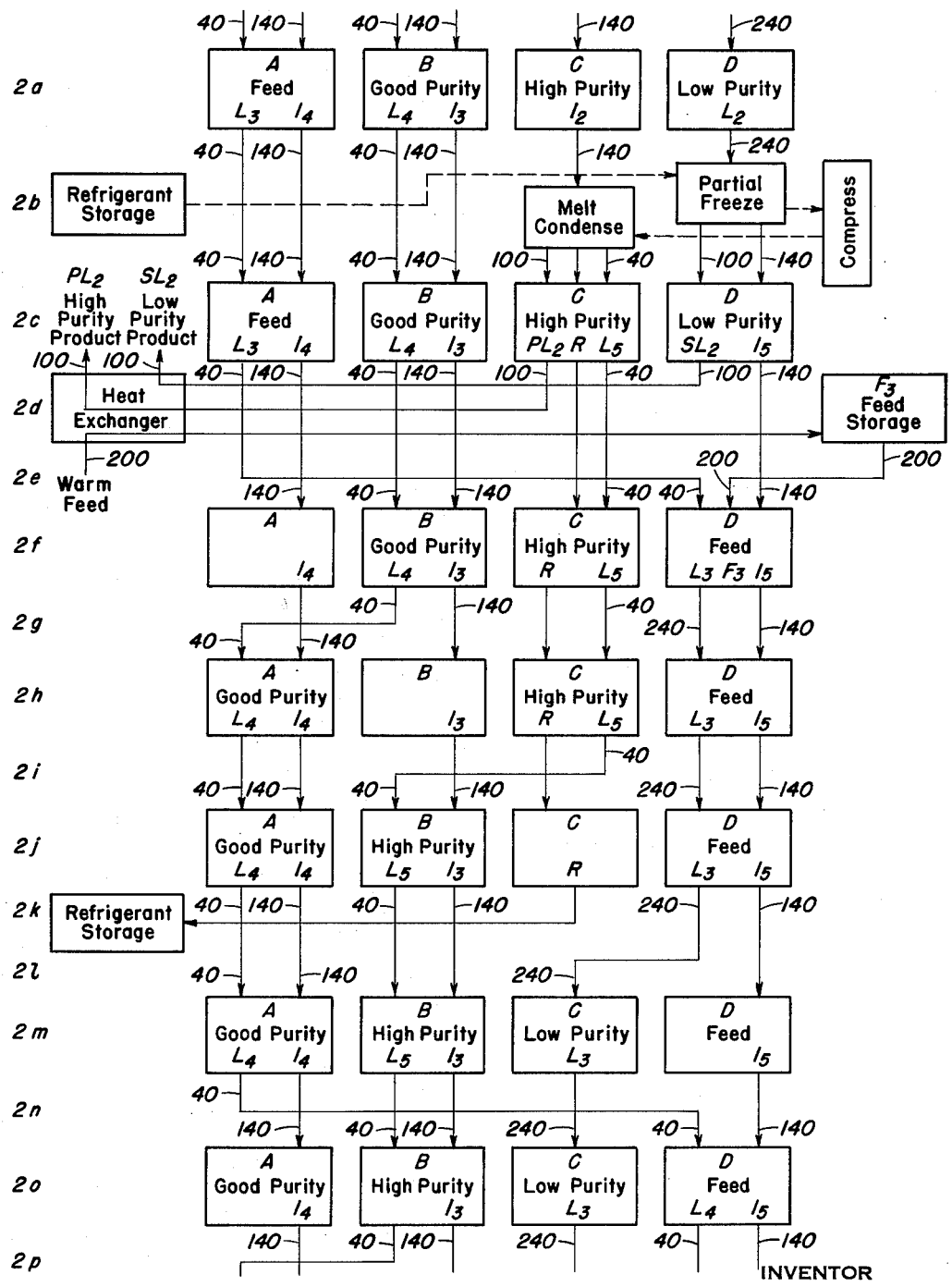

*Steps 2b through 2p.*—These are similar to 1b through 1p as already described, except that materials of different composition are present in the various tanks, and the transfers thereof are therefore as shown on FIGURE 6 and accomplished by use of the appropriate valves and pipes and conduits as described hereinabove.

Figure 7:
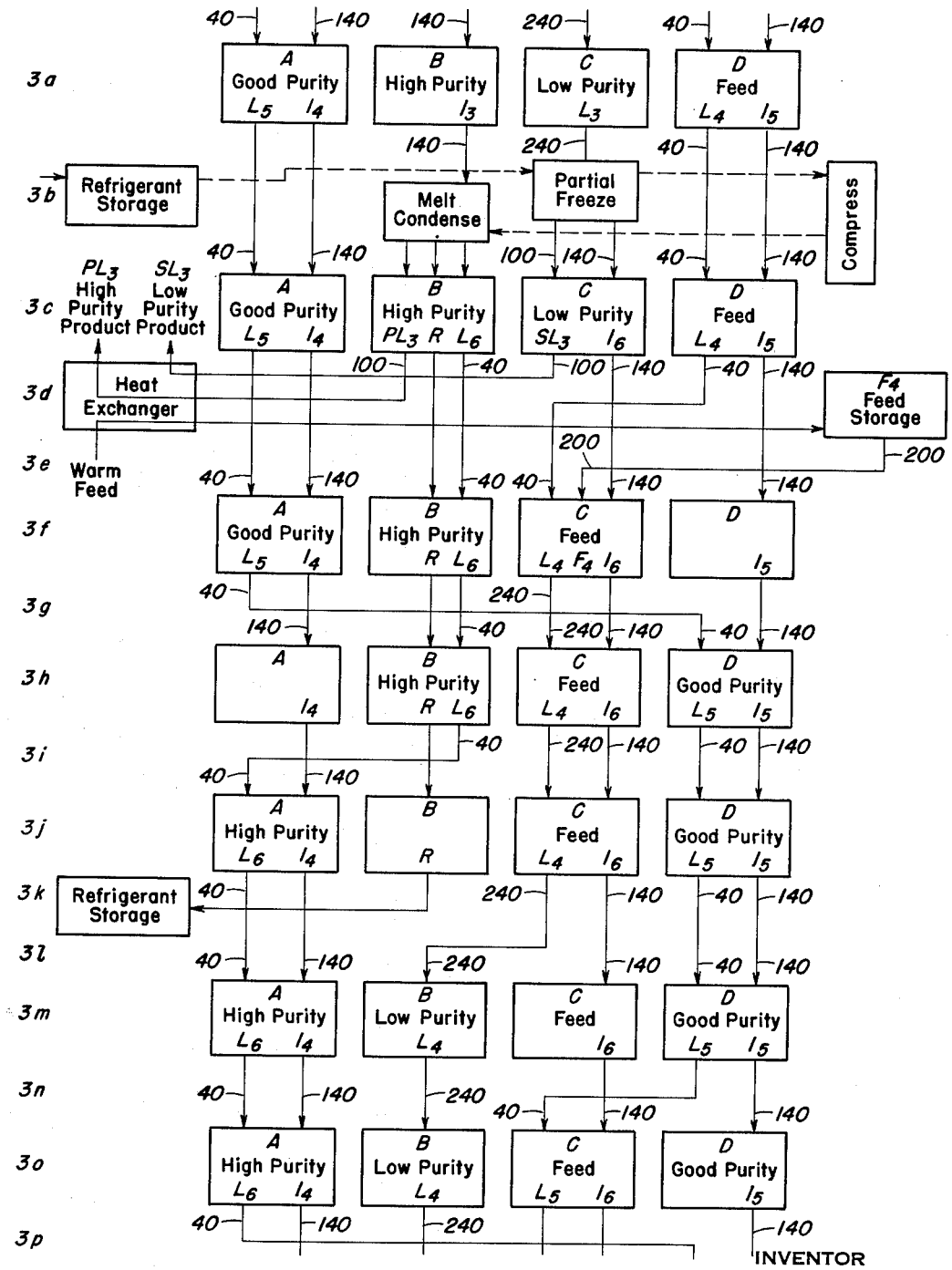
Figure 8:
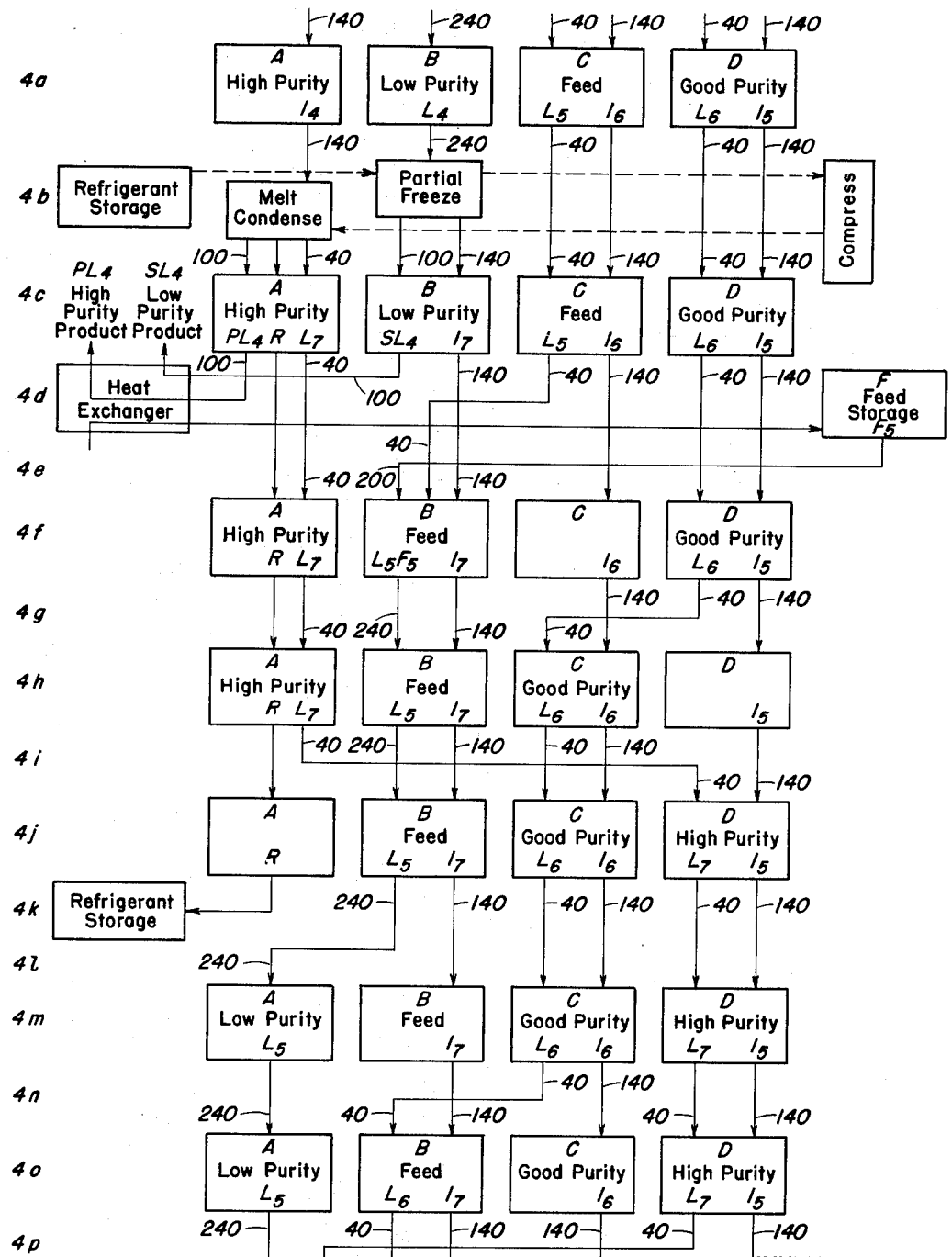

*Steps 3a through 3p, and 4a through 4p.*—As indicated in detail on FIGURES 7 and 8, these are similar to the previously described 1a through 1p and 2a through 2p sequences, except that different materials are present in the various tanks, as indicated in FIGURES 7 and 8 and transfer arrangements are appropriately different.

For the purpose of illustrating succeeding cyclic steps and employing the number-letter system utilized hereinabove, it will be seen that in this sequence, steps 5a through 5p, 6a through 6p, 7a through 7p and 8a through 8p are completely identical with 1a through 1p, 2a through 2p, 3a through 3p and 4a through 4p, respectively, including identity with respect to materials in the tanks and transfers.

Step 9a initiates, in turn, another sequence identical with those commencing with 1a and 5a; and steps 13a, 17a, etc., commence additional cycles. This sequence continues indefinitely.

Thus, the process depends on creating a mixture of solvent in the solid state, the solid state being free of solute, and a solution consisting of solvent and solute, and displacing the concentrated solution with progressively more dilute solutions. While physical laws determine the relation between the concentration of the ambient solution and its temperature, while in contact with the solid phase, economic factors determine the concentration to be used. Therefore, temperature and concentration are design variables which can be varied substantially within the application of the invention. Furthermore, concentration and temperature relations, applicable to desalinization of sea water would not be applicable to other systems and are conveniently determined by methods known to the art.

In this fashion, the plant is operated continuously, but in a batch after batch manner, cycle after cycle, with the part played by each tank changing at the end of each cycle.

Thus, to recapitulate with particular reference to the illustrative embodiments described hereinabove and with due regard to the broader aspects of the instant invention, the subject process can be said to encompass a method of recovering substantially pure normally liquid solvent (e.g. potable water) in the high purity product storage reservoir 14 (see, for example, step 1d above) from the warm feed (e.g. salt water) of container 12 which contains a substantial portion of solute (e.g. salt).

The method thus comprises, briefly, securing one batch after another of purified liquid solvent from a succession of batches of impure feed solution of solute and solvent by operation of a cyclic or repetitious purification system which in each cycle operates by partial freezing of one batch, melting of another batch, and draining and washing of other batches of mush composed of finely divided solid solvent admixed with a liquid solution of solute in solvent, on such a time schedule and in such quantities that partial freezing of a batch with liquid of highest solute concentration is substantially simultaneous with melting of the batch that has lowest solute concentration, part of the melt being withdrawn as product, the remainder of the melt being used as wash for the batch whose liquid is of next higher solute concentration compared with the melt. Other batches are each washed with liquid from a batch whose liquid has next lower solute concentration; a batch of feed liquid being introduced to that batch of mush that has liquid solution of highest solute concentration. The mother liquor resulting from partial freezing is removed as a product with solute concentration higher that that in the feed, the washings from the mush just produced by partial freezing being used for the partial freezing operation of the next cycle, which is carried out immediately after the completion of the preceding cycle.

Figure 5:
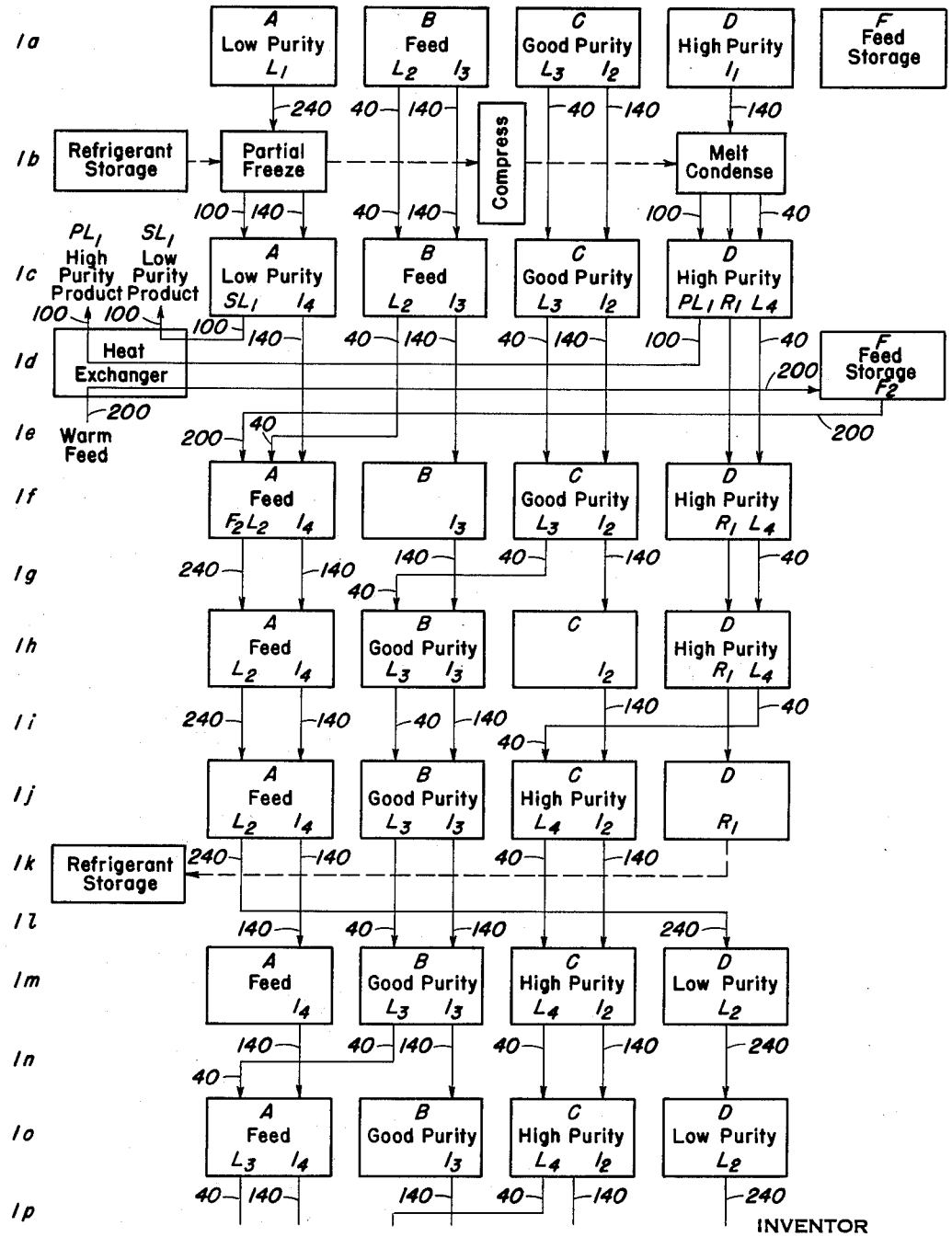
FIGURES 5 through 8 are sequence diagrams illustrating the manner in which the invention is carried out.

Viewing the foregoing procedure in a different manner and directing attention to one tank but with the understanding that the same sequence of operations is occurring in other tanks but in a differing time phase relationship, and taking tank A as the vessel of primary attention at time 4l (FIGURE 8), it will be noted that a solution is transferred from elsewhere in the system. This can be either a previously concentrated solution or raw feed. This solution is partly frozen, concentrating the solute in the mother liquor and producing a solid phase of the solvent which is relatively free of solute (FIGURE 5, time 1b). A portion of the mother liquor (i.e. the solution that remains unfrozen after partial freezing is effected) is then removed from the system and the residual mother liquor is diluted with or displaced by a solution from elsewhere in the system, i.e. from another vessel in which the same sequence of operations is being performed (FIGURE 5, time 1e); and the diluted of displaced solution is used elsewhere in the system.

With continued reference to tank A, in concert with the flow diagrams of FIGURES 5, 6, 7 and 8, it will be seen that the solution about the solid phase (i.e., frozen crystalline solvent) is successively diluted and displaced with solutions of progressively lower solute content. Similarly, the solution removed from the vessel will have progressively lower solute content. The number of dilutions will, of course, depend on the solvent purity desired; the concentration of the solution desired; the properties of the solid phase to retain interstitial and adsorbed solution and other physical factors.

Directing attention to tanks B, C and D in succession and starting at time 3l, 2l, 1l, respectively, it will be noted that the same sequence of operations occurs in each and that the other vessels become the source or recipient of the progressively more dilute and more concentrated solutions.

To recapitulate, then, there is provided in a first separate processing container a quantity of liquid solution made up of solvent and solute, and there are also provided each in a separate container, a series of mixtures of liquid solution and finely divided frozen or crystallized solvent, which solutions each have a different concentration of solute and all of which solutions are of lower solute concentration than the liquid slution in the first container. There is also provided a last processing container in which there is a mixture consisting mostly of relatively pure solid frozen solvent along with a limited amount of liquid solution that has a lower solute concentration than is present in any of the other solutions, and these several mixtures and solutions are processed by cooling the solution of highest solute content so that partial freezing occurs in the first container and by simultaneously melting of the substantially pure solid frozen solvent in the last container. A portion of the resulting liquids is then withdrawn from each of the two containers involved and removed separately from the process via heat and refrigerant exchange units through which a stream of feed solution is passing separately but in a countercurrent manner into that processing container, the liquid portion of which has a solute concentration greater than that of the feed solution. The process is continued by removing from each separate container, by draining or other means, a portion of the liquid solution in that container, and transferring each of these solutions to the container whose solution is of the next higher solute concentration; in so doing being sure to use as wash all of the liquid from the container that previously had the high proportion of frozen solvent which was subsequently melted, so that this container will be empty, and then transferring a portion of the liquid from the container in which partial freezing had occurred to the just-mentioned empty container, and also in these aforementioned draining and transferring operations being sure to leave a high proportion of frozen solvent and only a minimum proportion of solution in that container whose solution has the lowest solute concentration, and also, in general, draining and transferring such quantities of solution as will cause each container to contain approximately the same quantity of solution as was present in that container whose solution had the next lowest concentration prior to the freezing and melting operations already described, thereby providing again in one separate processing container a quantity of liquid solution made up of solvent and solute, a series of separate containers containing mixtures of solution and finely divided frozen crystallized solvent, which solutions are each of a different concentration from one another and all of these said solutions being of lower solute concentration than the solution in the container where no frozen solvent is present, and providing also a last processing container in which there is a mixture consisting mostly of relatively pure solid frozen solvent along with a limited amount of solution that has a lower solute concentration than is present in any of the other solutions, so that the series of processing operations described heretofore can be repeated, and repeated again and again, to produce as products a solution of low solute concentration, i.e., purified solvent, and a solution of high solute concentration, from a feed consisting of solution containing an intermediate solute concentration, all without moving the solid solvent from the container in which it was formed. It will be apparent that throughout this specification the term "concentration" in reference to solute content is to ambient solutions, not to average solute content of the heterogeneous mixture of solution and solid solvent.

The purification system in this manner is returned to the initial stage of operation described above, the sequence of steps having described a complete cycle. The process involves, of course, the continuing repetition of the aforesaid series of steps with sustained removal of purified solvent and waste solution containing the highest concentration of solute from the aforesaid system with infusion of a feed solution into this system. The initiation of the aforesaid process may be accomplished in a variety of ways, such as described hereinafter. It will be evident that the subject process is accomplished without moving frozen solvent (e.g., ice) from the container in which it is originally formed. Again, it is noted that the timing of the foregoing process is such that when partial freezing of the solution of highest solute content is accomplished in one container, melting of the frozen solvent mixed with solution containing the least concentration of solute is being effected in a second container and mixing, draining (or filtering), and washing of partially frozen solutions of intermediate solute concentrations (e.g., an icy mush) is being accomplished in one or more other containers of the series. The concentrated solutions recovered from this procedure, which is necessarily performed as a batch process, may be transferred to a storage container, if desired. In like manner some recovered purified solution may be retained in a separate storage compartment for subsequent recycling in the process as described hereinafter. The subject invention, while particularly applicable to the purification of sea water and brackish inland water, is also uniquely valuable in the purification of sewage effluent, industrial waste waters, acetoin, fruit juices and beer, including pharmaceutical beers, and for use with a wide variety of solutions in which the solvent is other than water.

The quantities given in the foregoing example are illustrative only, and applicable to a particular set of operating circumstances with sea water feed and a purity of 500 p.p.m. of dissolved salts in the product water and about 7 percent salts in the waste water, and equal quantities of sweet and saline water product. In actual operation under this set of circumstances the purity of the product water can be improved by withdrawing less than 100 pounds of high purity product in step $d$ of each of Figures 5 to 8 and vice-versa. In general, minor changes of this kind in steps $d$ are part of the regular operating procedure for the process, to adjust for inevitable minor variations in quantity or nature of the feed, variations in percentage of partial freezing, variations in washing effectiveness, and other normal processing irregularities. If desired, the necessary adjustments to maintain desired product purity can be made by adjustments of the percent of partial freezing in steps $b$ of FIGURES 5 to 8, or by adjustment of the quantity of waste brine removed in steps $d$ of FIGURES 5 to 8, or by the quantity or liquid drained from one tank and transferred to another tank at various steps in the process described in connection with FIGURES 5 to 8. These variations are analogous to well-known and widely used variations in the quantity of overhead or bottoms material removed from a continuous distillation column apparatus in order to maintain desired product purity, or to variations in the reflux ratio or reflux rate in such an apparatus.

The particular quantities to be used in various applications of the process will vary widely from those given in the example, for the same reasons that the analogous quantities in distillation operations vary widely from one application to another. Among the circumstances that cause these variations in the required quantities being transferred in the freezing process are: variations in solute content of the feed, variations in the desired purity or yield, variations in the crystal character and washing behavior for various kinds of feed. If unknown, these quantities may be estimated from small scale experiments, with or without calculations analogous to those of distillation. Such estimated quantities are used in initial operations of a large unit, with subsequent variations in quantities according to results actually obtained in the large unit.

The quantity of refrigerant used for partial freezing must be such that the heat absorbed by its evaporation is at least equal to the heat needed to produce the ice formed in the partial freezing operations. A further quantity of refrigerant is needed to make up for heat lost in leakage at various points in the process, as well as the incomplete exchange of heat in the heat exchanger, and the inefficiency of the compressor and pumps; all of these heat quantities being such as can be determined or estimated by well-known conventional methods.

It is to be noted that the process can be operated upon almost any desired scale, by simply varying the sizes of the tanks from a few gallons to millons of gallons, and using appropriately sized supplementary equipment, and a suitable number of refrigerant injectors or heat exchangers inside the tanks if direct refrigerant injection is not used. The minimum and maximum scale of operating is thus determined by mechanical, structural and economic factors.

The initial startup of the process to the point described as step 1$a$ may be accomplished in any of several ways. One method is to introduce into each tank such quantities of raw feed and pure solvent as are required to produce mixtures in each of the tanks of the composition needed for the operation of the process, said compositions being known from previous operation or from small scale experimentation or otherwise. If this is done, it is not necessary to make up any mixtures more concentrated in solute than the raw feed, but merely to use raw feed for initial filling of the tanks that require the higher solute concentrations. The general method just described can be used only if the required pure solvent is readily available. If more than the minimum amount of pure solvent can be easily obtained, the process can be started with pure solvent in as many tanks as possible. The result will be a relatively high purity waste stream during the first periods of operation. If desired, this may be used instead of feed or to dilute the feed until the level of impurities in this waste reaches that in the feed. If no pure solvent is available to start up the plant, raw feed may be used in all the tanks. In this case the initial high purity product will not be of the desired high purity, and will need to be recycled or discarded until it reaches the desired purity which will gradually occur as the operation is continued.

Many variations can be made in the process described herein to meet the requirements of particular situations, without changing the basic process or losing its advantages. Thus, the number of tanks may be made larger or smaller. The quantities and proportions of liquids transferred can be adjusted to suit various mixtures to be purified, and various degress of purification to be achieved.

One of the most important and useful ways of varying the process in detail without changing it basically is to combine or eliminate certain steps. Thus, in the process described with relation to FIGURES 5 to 8, the following changes are possible for ordinary sea water desalting operations:

(1) Step *e* may be carried out at the same time as Step *d*, bringing cooled feed into tank A (as in Step 1*f*) directly from the heat exchanger. This eliminates tank F, saves time and thus increases productivity of the remaining apparatus. In addition, the rate and effectiveness of washing of the mush may be improved if the feed liquid used for washing is introduced onto the ice mush bed simultaneously with draining of mother liquor because plug flow washing then occurs.

(2) Further, Steps *g, i* and *k* can be carried out simultaneously with Steps *d* and *e*, with similar results and for similar reasons. Also Steps 1 (*el*) *n* and *p* may be carried on simultaneously.

Even further combinations and condensations can be made. Thus, by way of illustration, it will be assumed that by initiation of the instant procedure as described hereinabove, there has first been established in a first zone a quantity of ice mush of desired purity, and in a second zone a mixture of ice mush and mother liquor such as result from the partial freezing operation to be described hereinafter. Then, into a third zone there is introduced through suitable heat exchanger and refrigerant recovery devices such as already described above a stream of sea water. Shortly thereafter liquid isobutane refrigerant is introduced into the bottom of this third zone so as to cause partial freezing. At the same time a part of the sea water is also introduced onto the top of the mother liquor and ice in the second zone, and removal of the mother liquor brine is commenced from the bottom of this container, the brine being removed from the process through suitable heat exchange and refrigerant recovery systems such as already described. Also at the same time, the isobutane which is vaporizing in the third zone is being removed to a compressor and the compressed vapor is introduced onto the top of the ice in the first zone, whereupon melting of ice commences, and a mixture of water and liquid isobutane passes from the bottom of this tank to a decanter where the two layers separate. The isobutane goes to storage to be recycled, while the water goes to a high purity wash storage tank for later use. After a short time, such as five minutes, most of the mother liquor brine has all been displaced from the interstices of the ice in the second tank and at this time the sea water wash that has been entering this container is stopped and a low purity wash stream whose origins will shortly become clear, is now used as wash water for the ice mush in the second zone. The washings leaving the tank at this time are only slightly more concentrated in salt than sea water and are directed into the third zone along with sea water which is still entering this zone and being partially frozen by entering isobutane liquid. At about this time the melted ice (high purity water) stream from the first zone is directed to product storage, via the heat exchangers and refrigerant recovery route. Shortly thereafter, the low purity wash stream into the second zone is stopped, and high purity wash is substituted. At this time the washings from the second zone are directed to a low purity wash storage tank, this being the method of origin of the low purity wash previously mentioned. Shortly after this time partial freezing is complete; melting is complete; and washing is complete; isobutane flow into zone 3 is stopped; and high purity wash flow into the second zone is stopped and the first zone is empty.

At this point the first subcycle of the operation is complete. In the second subcycle, melting is accomplished in the second zone, washing in the third zone, and feed is introduced into the first zone where partial freezing is then caused to occur. Operations are exactly as before, except in different zones. At the completion of the second subcycle, zone 2 is empty, zone 3 contains washed purified ice mush, and zone 1 contains a mixture of mother liquor brine and ice from partial freezing of the sea water feed. During subcycle 3, partial freezing of incoming sea water feed is done in zone 2, melting is done in zone 3, and washing in zone 1. At the end of the third subcycle, the first full cycle is complete and in the second full cycle the operations of the first cycle are repeated, beginning with melting in zone 1, washing in zone 2, and partial freezing in zone 3. The cyclic process thus described is now repeated indefinitely.

In a further modification the multiplicity of tanks, valves and pipe manifolds may be obviated by utilization of a single main tank in which vertical partitions are disposed to divide the interior of said tank illustratively into thirds. The main tank is enclosed by substantially flat walls at the top and bottom thereof; said walls being in contiguous relation with the aforesaid internally disposed partitions. The upper and lower walls of the main tank form in turn the bottom and top walls respectively of two subsidiary tanks. Each of the aforesaid walls will have disposed therein appropriate orifices and channels and will be positioned in face-to-face relationship with discs made, for example, of polyethylene, containing corresponding orifices and channels and adapted for rotation about a centrally located spindle within said subsidiary tanks. In this manner by opening and closing of the appropriate orifices and channels isobutane is transferred from one or another of the thirds of the main tank to the inlet of a compressor positioned in the upper subsidiary tank and from the outlet of the compressor to another third of the main tank; other of said orifices serving to introduce wash water into the desired third of the main tank. The rotatable plastic disc arrangement disposed exterior to the bottom wall of the main tank permits the passage of the various liquids to and from the various thirds of the main tank, by means of standard pump means. The process involved is substantially identical to that described with relation to the schematic and sequence diagrams of FIGURES 1 to 8 herein.

Use of a liquefied normally gaseous refrigerant which is relatively insolube in the water or other solvent involved has several distinct advantages in the practice of the other method steps of the invention. Thus, after condensation in any of the several tanks A–D of FIGURE 1, the refrigerant is present predominantly as a separate liquid layer, which can be separately withdrawn. Illustratively, if it is the lighter liquid, it will remain after water or mother liquor is withdrawn through the bottom of the tank. Injection of the liquefied refrigerant at the bottom of the tanks in which partial freezing is to occur accomplishes good mixing, eliminating the need for stirrers, and the like, to assure contact between ice and mother liquor. Finally, because of the low solubility of the refrigerant in the solvent and its high volatility, the residual refrigerant is readily and substantially stripped from the product stream in the devices 11*a*, 11*b*, 11*c*, and 11*d*.

Though important advantages accrue from employing the refrigerant in direct contact with the liquid, it will be understood that, in its broader aspects, the present method can be carried out with more conventional type refrigeration cycles in which the refrigerant is in heat exchange relation with the liquid during freezing, and the solid during melting, but does not come into direct contact therewith. When so carried out, the invention can employ any suitable refrigerant, including ammonia, carbon dioxide, sulfur dioxide, freons and other materials.

Variations on the washing procedure employed in the aforesaid tanks A–D are several, and include what are designated as plug flow, non-dryout, and melt washing procedures, as well as a combination thereof.

The first of these techniques, plug flow washing, involves the addition of wash water (relatively pure solvent) to the top of the bed of ice to be washed, at the same rate as washings are removed from the bottom of the tank, and while the interstices between the ice crystals of the bed are completely filled with liquid. With some mixtures, this results in removal of entrained mother liquor much more efficiently (i.e. with the use of much less wash water) than more conventional methods of washing. This process may also be modified by introduction of the wash liquor at the bottom of the tank with removal of the washings at the top of the tank containing the bed of ice crystals.

A related technique, that of non-dryout washing, is often, and indeed, usually necessary as a preliminary step to efficient plug flow washing. In ordinary washing procedures it is usual to first drain as much entrained liquor from the slurry as is possible, often with the use of a suction or pressure filter. In non-dryout washing the filtration or draining step is stopped while the interstices between the crystals are still filled with liquid; and while there is a thin continuous layer of liquid on the upper surface of the bed of ice crystal-containing mush within each of the tanks. Washing is then commenced by introducing wash or relatively pure solvent onto the surface of the liquid on top of the mush, with a minimum degree of turbulence being produced in the latter liquid. At the same time removal of liquid from the bottom of the bed is commenced at the same rate at which relatively pure liquor is being introduced at the upper end of the bed. Non-dryout washing inherently incorporates plug flow washing, but involves the additional factors of never allowing any of the solid crystals to be exposed to a gas or vapor phase until the washing process is complete.

Melt washing is, in turn, a modification of the washing procedure in which the mother liquor is partially or completely removed by the usual filtration procedures described hereinabove in the illustrative description of an entire cycle of the inventive process, and wherein the wash liquid is then created from the crystals remaining in the tank by partial melting of the upper portion of said crystals by means, for example, of compressed refrigerant introduced therein. When sufficient melting has occurred to produce the desired quantity of wash liquid, the compressed refrigerant supply is cut off and washing is then completed by any desired procedure.

In combining melt, non-dryout and plug flow washing, the filtration is allowed to continue for a short period after the upper surface of the ice crystal mush is exposed by lowering the level of the mother liquor. At this point the filtration is stopped so that the liquid level remains constant. Next, refrigerant vapor under pressure is introduced, causing melting of the upper exposed portion of the crystals. When this upper layer of relatively pure liquid forms, it is used to wash the remaining crystalline mush by the aforesaid plug flow or non-dryout procedures. This process thus reduces the need for handling of the wash liquid.

Inasmuch as ice is of lower density than water, the performance of the aforesaid washing techniques sometimes requires the presence within the processing tanks of hold-down devices to prevent the upper portion of the ice mush from rising out of the mother liquor or wash liquid so that the upper portion of the ice mush is partly drained of its liquid content and vapor penetrates between the ice particles. One type of effective hold-down device consists of strips or partitions of corrugated metal positioned in the processing tanks A–D, illustratively, and mounted in a vertical manner on the bottom of each of said tanks. The amplitude of the corrugation should be about $\frac{1}{10}$ the tank diameter but not larger than one foot. In very large tanks the corrugated partitions should be about ten feet apart.

As indicated hereinabove, a batch process is preferred to a continuous operation because it avoids moving the ice. In addition the batch process is also preferred for reasons of economy in the employment of power; economic considerations are, of course, very significant in the subject field and power for the refrigeration compressors provides a major area of cost in freezing demineralization. The power consumed is related directly to the pressure at the inlet to each compressor, if the outlet pressure is maintained at a fixed value. In a freezing demineralization process using direct contact refrigeration with an immiscible or slightly soluble refrigerant, such as isobutane, the pressure at the compressor inlet is nearly the same as the pressure at which the isobutane vapor separates from the ice slurry that is produced by the vaporization of the isobutane or like refrigerant. This isobutane escape pressure will be close to the equilibrium vapor pressure of isobutane at the temperature of the slurry, and the temperature of the slurry will be near the equilibrium freezing point of the salt solution in the slurry. In a batch cyclic process (described hereinabove), this temperature is initially the freezing point of the feed liquor (i.e. $-2.15°$ C. for a 3.5 percent sodium chloride solution) and the temperature drops gradually as increased amounts of ice are formed during the freezing of a batch of feed. When 50 percent of the water is frozen, the salt concentration in the remaining liquor is seven percent and the freezing point is $-4.3°$ C. The average temperature for this process is about $-3.2°$ C., and the initial, final and average isobutane vapor pressures are 20.8 pounds per square inch absolute (p.s.i.a.), 19.5 p.s.i.a. and 20.2 p.s.i.a., respectively. By way of contrast, in a comparable continuous process in which 50 percent of the water in the feed is being frozen, the temperature and pressure at which the isobutane separates from the slurry does not vary with time, and is that corresponding to the seven percent salt solution, i.e. $-4.3°$ C. and 19.5 p.s.i.a. Thus, where a compressor outlet pressure of 23 p.s.i.a. is maintained in a continuous plant, the inlet pressure is 19.5 p.s.i.a., while in a batch cyclic plant, it is an average of 20.2 p.s.i.a., so that in the latter, the compressor is required to do appreciably less work and lower power costs are incurred.

It is to be noted that while the process completely avoids the moving of ice, as such, from stage to stage, when the freezing technique is employed, this advantage is accomplished without involving large heat gains or heat consumption resulting from melting the ice and refreezing. The entire plant operates at or below 0° C., with none of the circulating or transferring materials being permitted to rise appreciably in temperature except in the heat exchanger 11. It will be further noted that maximum benefit from the refrigerant employed is secured by means of device 11, wherein the incoming feed is cooled by the product stream.

In summary, it will be seen therefore that the present invention provides a method for producing a less concentrated and a more concentrated solution from a feed solution of a solute in a solvent. The most significant application of the invention presently is to the recovery of substantially pure solvent from sea water or brackish water, as indicated, but its scope of application is otherwise extensive, being applicable, in addition, to the recovery of solvent from, for example, acetoin, sewage effluent, industrial waste waters, fruit juices and beer.

What is claimed is:

1. Process for procuring a purified solvent from an impure feed solution in a cyclic batch process operating substantially batchwise on a continuous succession of discrete batches of material in unfilled unpacked tanks or containers of minimum internal surface area and maximum internal volume that permit agitation of any batch to assure that it is a substantially homogeneous mixture at any desired time, said process comprising, sequentially partially freezing, draining, washing and melting a plurality of discrete batches of material derived from the impure feed solution; the partial freezing of a batch of solution with highest solute concentration being effected substantially simultaneously with melting of the batch containing frozen solvent and solution of lowest solute concentration;

withdrawing part of the mother liquor resulting from the partial freezing as concentrated solution product;

withdrawing part of the solution from the batch subjected to melting as the purified solvent product, the remainder of the melt being used to wash the batch whose liquid portion is of next higher solute concentration compared with the melt;

washing each of the remaining batches with solution from the batch whose solution is of next lower solute concentration, a batch of impure feed solution being also introduced to a batch being washed the liquid solution of which has a solute concentration greater than that of the said impure feed solution;

reserving the washings from the batch of highest solute concentration for partial freezing in the next cycle of the process; and carrying out all transfers of material into, out of, and between containers during periods of time different from and alternating with periods of time during which operations are carried on within containers.

2. The cyclic process of which one cycle comprises, providing in a first container a liquid solution composed of solvent and solute;

in a plurality of like separate containers providing a plurality of mixtures composed of liquid solution of solvent and solute and finely divided solid crystallized solvent, each of said solutions in said latter plurality of containers having a distinct and lower concentration of solute than the liquid solution of said first container;

providing in a last processing container a mixture composed of substantially pure, finely divided, solid frozen solvent and a reduced amount of liquid solution having a lower solute concentration than is present in any of the aforesaid containers;

treating the solution of highest solute concentration in said first container by direct introduction thereinto of a liquid refrigerant whose vaporization causes cooling and partial freezing of said solution;

collecting and slightly compressing the refrigerant vapor and using this compressed vapor to cause melting, substantially simultaneously with the aforesaid partial freezing, of the solid frozen solvent in said last processing container containing solution of minimum solute concentration;

removing part of the resulting liquids from said first and last containers as separate product streams disposed concurrently to each other;

transmitting a feed solution stream separately from the aforesaid liquid streams and in free gaseous contact therewith; said streams passing through heat and refrigerant exchange units with consequent cooling of said feed stream by the aforesaid liquid streams and with transfer of gaseous refrigerant disposed in said latter streams to said feed stream;

passing said feed solution into a container having a liquid solution the solute concentration of which is greater than that of the feed solution; and transferring a portion of each of the liquid solutions then present in all but the last of said containers, and all of the liquid solution in the last of said containers, to another of said containers wherein the solution present is of the next higher solute concentration, and transferring the solution having the highest solute concentration into the container emptied of the material having the lowest solute concentration, to provide again a liquid solution and a plurality of mixtures of solution and solid solvent as at the beginning of the cycle, all said operations being performed so that the solid phase formed by partial freezing is not moved from the container in which it is first formed, until after it is melted, and carrying out all transfers of material into, out of, and between containers during periods of time different from and alternating with periods of time during which operations are carried on within containers.

3. Process for securing a series of batches of purified solvent from solution that comprises, simultaneously treating at least three batches of material including a solution containing a high concentration of solute, at least one mixture containing frozen solvent and a solution with lesser concentration of solute, and a mixture of frozen solvent and purified solution formed substantially of frozen solvent, each of said batches being provided in a separate container, said containers being unfilled and unpacked so as to have minimum internal surface area in contact with their contents and being such as to permit agitation to assure that a batch is a substantially homogeneous mixture when this is desired;

carrying out a cycle of operations consisting of partially freezing the high solute concentration solution and melting the frozen solvent in the mixture with purified solution;

removing separately part of the liquid phase of the high solute concentration solution and part of the mixture of melted solvent and purified solution produced by the aforesaid melting operation;

introducing a raw feed solution of solvent and solute into a container having a liquid phase of greater solute concentration than the feed, said high solute concentration and purified solutions being removed concurrently to each other and countercurrently to said feed solution;

transmitting each of said high concentration, purified, and feed solutions through heat exchange units with consequent cooling of said feed stream by said high concentration and purified streams;

transferring the remainder of the mixture produced by the aforesaid melting operation into that container whose solution is of next higher solute concentration;

passing a portion of the liquid phase of each intermediate solution present into the container holding a partially frozen solution of sequentially higher concentration of solute;

transferring solution from the container in which partial freezing had taken place into the emptied container previously holding the purified solution; and repeating the aforesaid cycle of operations.

4. The cyclic process of which one cycle comprises, providing in a first container a liquid solution composed of solvent and solute;

in a plurality of like separate containers providing a plurality of mixtures composed of liquid solution of solvent and solute and finely divided solid crystallized solvent, each of said solutions in said latter plurality of containers having a distinct and lower concentration of solute than the liquid solution of said first container;

providing in a last processing container a mixture composed of substantially pure, finely divided solid frozen solvent and a reduced amount of liquid solution having a lower solute concentration than is present in any of the aforesaid containers, said containers being equipped with internal coils through which cooling or heating fluids may pass, but being otherwise unfilled or unpacked so as to have minimum internal surface area in contact with their contents and being such as to permit agitation to assure that a batch is a substantially homogeneous mixture when this is desired;

cooling the solution of highest solute concentration in said first container by indirect heat exchange to effect partial freezing of said solution;

substantially simultaneously melting the solid frozen solvent in said last processing container containing solution of substantially maximum solvent concentration;

removing part of the resulting liquids from said first and last containers as separate streams disposed concurrently to each other;

transmitting a feed solution stream adjacent but separate from the aforesaid concurrent liquid streams and effecting heat exchange therebetween, whereby said feed stream is cooled;

said feed solution then being passed into that container having a liquid solution the solute concentration of which is greater than that of the feed solution;

transferring a portion of each of the liquid solutions then present in all but the last of said containers, and all of the solution in the last of said containers, to another of said containers wherein the solution present is of the next higher solute concentration, and transferring the solution having the highest solute concentration into the container emptied of the material having the lowest solute concentration, to provide again a liquid solution and a plurality of mixtures of solution and solid solvent as at the beginning of the cycle; and carrying out all transfers of material into, out of, and between containers during periods of time different from and alternating with periods of time during which operations are carried on within containers.

5. The process for separating a solvent and solute that comprises, providing a first main container that is empty, a second main container containing mush of finely divided frozen solvent in a solution of solute and solvent whose liquid portion is relatively concentrated in solute, a third main container containing a mush whose liquid portion is relatively dilute in solute, and a first auxiliary container with a low-purity wash solution of solute in solvent in which the solute concentration is intermediate between those of the aforesaid second and third containers but nearer to that of the second container, all said main containers being unfilled and unpacked so as to have minimum internal surface area in contact with their contents;

during a first time period passing into the empty container a quantity of cooled feed solution and passing into this feed solution immiscible refrigerant liquid which is normally gaseous and which will vaporize at the pressure and temperature existing in this container and thereby causing agitation and thus substantial homogeneity of the contents of the container at any instant, and also thereby causing cooling and partial freezing of this feed solution;

at this same time collecting and compressing the refrigerant vapor and subjecting it to compression less than needed for liquefaction;

passing this compressed refrigerant gas into the third container containing mush whose liquid portion is relatively dilute in solute and causing gradual melting of the solid solvent in this container and also liquefaction of the refrigerant;

withdrawing these two liquids through a separating decanter;

returning the separated liquid refrigerant to a storage container from which it came originally;

passing a first portion of the separated melted solvent to a high purity wash storage container, this being a second auxiliary container;

removing as product the remaining melted solvent after passing it through a heat exchanger countercurrent to but separate from the entering feed liquid, said feed having solute concentration intermediate between the solutions of the second and third aforesaid main containers;

also during the first portion of this same time period passing a portion of the cooled entering feed into said second container while withdrawing from said container a portion of its liquid and removing this liquid as another product after passing it separately through the heat exchanger concurrently with the melted solvent and separately but countercurrently from the entering feed;

during the middle portion of this time period substituting low purity wash liquid from the first auxiliary container for the portion of the feed that was entering the container whose solution had higher solute concentration at the beginning of the aforesaid time period;

also during this middle portion of the time period continuing to withdraw liquid from said second container but sending the liquid to the container in which partial freezing is taking place;

during the latter portion of this same time period introducing into said second main container some of the aforementioned high purity wash liquid produced during the first portion of the melting process;

also during said latter period continuing to remove liquid from said second main tank but directing it to said low purity wash storage container;

conducting the aforesaid operations at such rates, with such quantities, and with such insulation and such auxiliary cooling and heating that at the end of the first time period the container in which melting has occurred is empty, and the container in which partial freezing has occurred contains a mush whose liquid portion is relatively concentrated in solute to an extent that closely approximates the condition that existed in the second container prior to the aforesaid series of operations, and the container in which washing was performed contains at the end of the aforementioned time period a mush relatively dilute in solute to an extent closely approximating the condition that existed in the third container prior to the aforesaid time period, whereby at the end of the time period there exists a container that is empty, a container with a mush whose liquid portion is relatively concentrated in solute, and another container with a mush relatively dilute in solute, as well as a first and second auxiliary container, the first of which contains said low purity wash liquid;

repeating the aforesaid operations in a second time period and in succeeding time periods to convert a succession of batches of feed liquid into a succession of batches of a product of low solute content and a succession of batches of high solute content, without in any case moving solid solvent from the container in which it is first formed, and with partial freezing, melting, draining and washing all proceeding simultaneously in different containers during each time period; and all said operations being performed so that the solid phase formed by partial freezing is not moved from the container in which it is first formed, until after it is melted.

6. The process as claimed in claim 5, wherein the step of passing part of the feed into the container whose liquid is of relatively high solute concentration is omitted, and low purity wash liquid is substituted therefor.

7. The process as claimed in claim 6, wherein auxiliary high and low purity wash containers are eliminated;

the first portion of the melted solvent issuing from the decanter during any time period is passed into the container whose solution at the beginning of the time period is of relatively high solute content;

the liquid being withdrawn at this same time from said container is passed directly to the heat exchanger as product of relatively high solute content;

the remainder of the melted solvent issuing from the decanter during the latter portion of the aforesaid time period is passed to the heat exchanger as product of relatively low solute content; and the liquid being withdrawn during the latter portion of the time period from the container which contained solution of relatively high solute content at the beginning of the time period is passed into the container in which partial freezing is being carried out.

8. The process as claimed in claim 5, wherein said refrigeration of the solution to be partially frozen is indirect;

the cooling to cause partial freezing and the heat for melting is supplied by means of heat exchangers located within each of said main tanks;

a liquid refrigerant material is passed into said heat exchanger in the tank where partial freezing is to be achieved and expanded to vapor while passing therethrough;

the resulting refrigerant vapor is somewhat compressed and the compressed vapor passed to the heat exchanger in the container in which melting is desired; and conditions of temperature and pressure being maintained so as to cause the desired partial freezing and melting along with the vaporization and liquefaction of the refrigerant, which is continually recycled to and from a storage reservoir.

References Cited by the Examiner

UNITED STATES PATENTS

| | | |
|---|---|---|
| 318,972 | 6/85 | Fales. |
| 1,378,858 | 5/21 | Hayes. |
| 1,661,403 | 3/28 | Barneby _____ 202—67 |
| 2,144,433 | 1/39 | Schumacher. |
| 2,242,267 | 5/41 | Seidel _____ 202—67 |
| 2,896,587 | 5/61 | Hess. |
| 3,019,611 | 2/62 | Toulmin _____ 62—58 |
| 3,095,295 | 6/63 | Colton _____ 62—58 |
| 3,128,188 | 4/64 | McIntire _____ 62—58 X |
| 3,154,395 | 10/64 | Stine. |

FOREIGN PATENTS

| | | |
|---|---|---|
| 217,766 | 10/58 | Australia. |
| 70,507 | 6/46 | Norway. |

NORMAN YUDKOFF, *Primary Examiner.*